United States Patent [19]

Niedospial, Jr.

[11] Patent Number: 4,883,235
[45] Date of Patent: Nov. 28, 1989

[54] FILM CASSETTE

[75] Inventor: John J. Niedospial, Jr., Rochester, N.Y.

[73] Assignee: Eastman Kodak Company, Rochester, N.Y.

[21] Appl. No.: 320,440

[22] Filed: Mar. 8, 1989

[51] Int. Cl.⁴ ............................................. G03B 17/26
[52] U.S. Cl. ..................................... 242/71.1; 354/275
[58] Field of Search ....................... 242/71, 71.1, 71.8, 242/71.9; 354/275

[56] References Cited

U.S. PATENT DOCUMENTS

| | | | |
|---|---|---|---|
| 988,341 | 4/1911 | Hill . | |
| 2,541,476 | 2/1951 | Mihalyi | 242/71 |
| 3,234,024 | 2/1966 | Leinonen | 96/78 |
| 3,659,799 | 5/1972 | Cerutti et al. | 242/71.9 |
| 3,677,499 | 7/1972 | Wangerin | 242/210 |
| 3,695,160 | 10/1972 | Stockdale | 242/71.1 X |
| 3,797,777 | 3/1974 | Hosono et al. | 242/197 |
| 4,423,943 | 1/1984 | Gold | 354/275 |
| 4,488,796 | 12/1984 | Edwards | 354/275 |

Primary Examiner—Stuart S. Levy
Assistant Examiner—Steven M. DuBois
Attorney, Agent, or Firm—Roger A. Fields

[57] ABSTRACT

A film cassette is disclosed wherein a film spool is rotatable within the cassette shell, a convoluted film roll whose outermost convolution is a film leader is coiled about the spool, a pair of film constraining flanges are coaxially arranged on the spool to radially confine the film leader to prevent the leader from substantially contacting an interior wall of the cassette shell, and a film stripper-guide is received between a leading end of the film leader and the next-inward convolution of the film roll succeeding the leader to remove the leader from the flanges and guide it through a film passageway to the exterior of the cassette shell responsive to rotation of the spool in a film unwinding direction. According to the invention, the film leader and at least one of the constraining flanges include mutual engagement means for maintaining the leading end of the leader spaced at least a minimum radial distance from the next-inward convolution sufficient to locate the leading end within range of the stripper-guide to ensure that the leading end will be advanced over the stripper-guide responsive to rotation of the spool in the film unwinding direction, whereby the leading end is prevented from being advanced between the stripper-guide and the next-inward convolution.

8 Claims, 6 Drawing Sheets

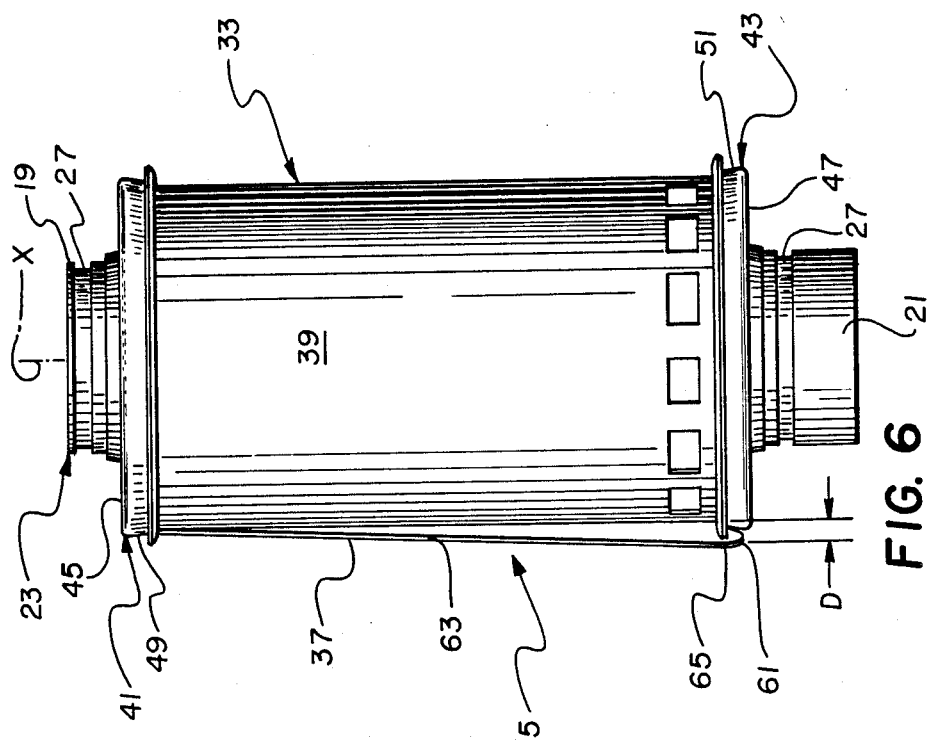
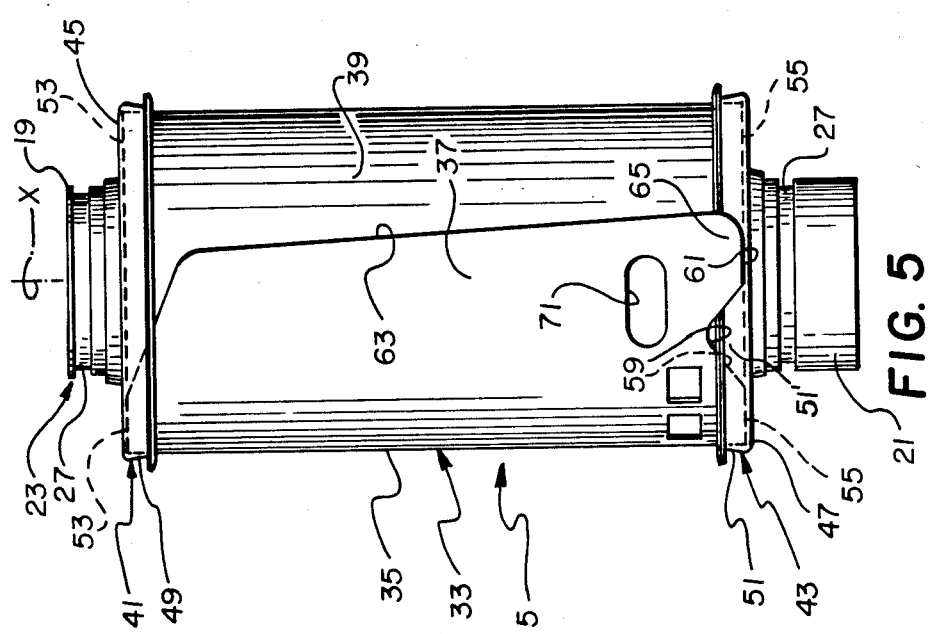

FILM CASSETTE

CROSS-REFERENCE TO RELATED APPLICATIONS

Reference is made to commonly assigned copending applications Ser. No. 173,396, entitled FILM CASSETTE, and filed Mar. 25, 1988 in the names of Jeffrey C. Robertson and Mark D. Fraser, Ser. No. 193,323, entitled FILM CASSETTE, and filed May 12, 1988 in the name of Jeffrey C. Robertson, Ser. No. 07/296,551, entitled FILM CASSETTE and filed Jan. 12, 1989 in the names of John J. Niedospial, Jeffrey C. Robertson and Mark D. Fraser, Ser. No. 07/320,438, entitled FILM CASSETTE, and filed Mar. 8, 1989 in the names of Patricia D. Fairman and John J. Niedospial, and Ser. No. 07/320,438, entitled FILM CASSETTE, and filed Mar. 8, 1989 in the names of Christopher T. Mattson and John J. Niedospial.

BACKGROUND OF THE INVENTION

1. Field of the Invention

The invention relates generally to the field of photography, and particularly to a film cassette containing roll film.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, can be operated to automatically advance the filmstrip out of the cassette shell by rotating the film spool in the unwinding direction. The film leader normally does not protrude from the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the leading end of the filmstrip is slightly tapered along one longitudinal edge purportedly to allow it to freely extend from between the circumferential lips and rest against the shell wall. During initial unwinding rotation of the film spool, the leading end of the filmstrip is advanced along the shell wall until it reaches an entry to a film passageway in the cassette shell. Then, it is advanced into and through the film passageway to the outside of the cassette shell. The passageway has a width that is slightly less than the width of the filmstrip, thus resulting in the filmstrip being transversely bowed as it is uncoiled from the film spool, and thereby facilitating movement of the film edges under the circumferential lips of the respective flanges. However, severe transverse bowing of the filmstrip to move its longitudinal edges under the circumferential lips results in increased friction between the filmstrip and the cassette shell which will impede advance of the filmstrip from the shell and may damage the filmstrip. Another problem arises from the fact that the leading end of the filmstrip appears to be approximately 1⅛ inch to 1¼ inch long (judging by the number of perforations illustrated in the leading end). In a high temperature and/or humidity environment, the ability of the filmstrip to clock-spring outwardly when coiled about the spool is lessened, and there is more of a tendency of the filmstrip to curl inwardly. Consequently, the leading end because of its length may curl away from the shell wall, whereupon it may be unable to gain access to the film passageway when the film spool is rotated in the unwinding direction.

THE CROSS-REFERENCED APPLICATIONS

Like the type of film cassette disclosed in U.S. Pat. No. 4,423,923, cross-referenced applications Ser. Nos. 173,396 and 193,323, each disclose a film cassette that contains a non-protruding film leader which is automatically advanced to the outside of the cassette shell in response to rotation of the film spool in the unwinding direction. Specifically, there is disclosed a film cassette wherein a convoluted film roll is wound on a spool between a pair of coaxially spaced, independently rotatable flanges. The two flanges have respective circumferential annular lips which prevent the outermost convolution of the film roll, including its leading end, from clock-springing into contact with the interior wall of the cassette shell. When the spool is initially rotated in the unwinding direction, the flanges momentarily remain stationary and the film roll, since its inner end is secured to the spool, tends to expand radially to ensure a firm non-slipping relation between the outermost convolution and the annular lips. Once the non-slipping relation exists, continued rotation of the spool will similarly rotate the flanges. This allows stationary internal spreaders to deflect successive portions of the annular lips to an axial dimension exceeding the film width, in turn allowing the leading end to be freed from the radial confinement of the annular lips and to be advanced through a film passageway to the outside of the cassette shell. A stripper-guide is located immediately in front of the film passageway to divert the leading end from the flanges and into the film passageway. To accomplish this, the stripper-guide must be received between the leading end and the next-inward convolution of the film roll. If, however, the film cassette is used during extremely high temperature and/or humidity conditions, it might be possible that the leading end after being freed from the radial confinement of the annular lips will retain a great deal of inward curl. Consequently, the leading end will not have sufficient clock-spring to separate sufficiently from the next-inward convolution to move within range of the stripper-guide. Thus, when the spool is rotated in the unwinding direction, the leading end may not be picked up by the stripper-guide and guided into the film passageway.

The film cassette disclosed in cross-referenced application Ser. No. 07/296,551 like the ones disclosed in the first two cross-referenced applications contains a non-protruding film leader which is automatically advanced to the outside of the cassette shell in response to unwinding rotation of the spool. In this example, a leading section of the film roll is tapered assymetrically and is relatively short to allow it to normally protrude from between the annular lips of the flanges and into slight contact with the interior wall of the cassette shell. When the spool is initially rotated in the unwinding direction, it is rotated relative to the flanges until there results a firm non-slipping relation between the outermost convolution and the flanges, to thus cause the flanges to be rotated thereafter with the spool. The non-slipping relation imparts a beam strength or longitudinal rigidity to the leading section of the film roll in contact with the shell wall which, when the spool is rotated in the unwinding direction, combines with the assymetric design of the leading section to increase the likelihood that the leading section will feed into the film passageway. If, however, the leading section has been stored between the stripper-guide and the next-inward convolution of the film roll, particularly for an extended time, rather than being stored in contact with the interior wall of the cassette shell, it could develop sufficient inward curl to keep it out of range of the stripper-guide. Consequently, when the spool is rotated in the unwinding direction, the leading section will not be picked up by the stripper-guide and guided into the film passageway.

SUMMARY OF THE INVENTION

According to the invention, there is provided an improved film cassette wherein (a) a film spool is rotatable within the cassette shell, (b) a convoluted film roll whose outermost convolution is a film leader is coiled about the spool, (c) a pair of flanges are coaxially arranged on the spool to radially confine the film leader to prevent the leader from substantially contacting an interior wall of the cassette shell, and (d) a film stripper-guide is received between a leading end of the film leader and the next-inward convolution of the film roll succeeding the leader to remove the leader from the flanges and guide the leader through a film passageway to the exterior of the cassette shell responsive to rotation of the spool in a film unwinding direction, and wherein the improvement comprises:

said film leader and at least one of said flanges include mutual engagement means for maintaining the leading end of the leader spaced at least a minimum radial distance from the next-inward convolution sufficient to locate the leading end within range of the stripper-guide to ensure that the leading end will be advanced over the stripper-guide responsive to rotation of the spool in the film unwinding direction, whereby the leading end is prevented from being advanced between the stripper-guide and the next-inward convolution.

In a preferred embodiment of the invention, the flanges include respective peripheral annular lips adapted to overlap the film leader radially outwardly of the opposite longitudinal edges of the leader to radially confine the leader. The engagement means includes a lip-receiving notch cut in the film leader along one of its opposite longitudinal edges, relatively close to its leading end, for receiving one of the annular lips to allow a relatively short edge-section of the leader connecting the leading end and the notch to overlap the same lip radially outwardly to thus maintain the leading end spaced the minimum radial distance from the next-inward convolution.

BRIEF DESCRIPTION OF THE DRAWINGS

FIGS. 5 and 6 are elevation views of the film roll and the film spool, illustrating the manner in which the film roll is stored on the film spool.

DETAILED DESCRIPTION OF THE PREFERRED EMBODIMENT

The invention is disclosed as being embodied preferably in a 35 mm film cassette. Because the features of this type of film cassette are generally well known, the description which follows is dircted in particular to elements forming part of or cooperating directly with the disclosed embodiment. It is to be understood, however, that other elements not specifically shown or described may take various forms known to persons of ordinary skill in the art.

Figure 1:
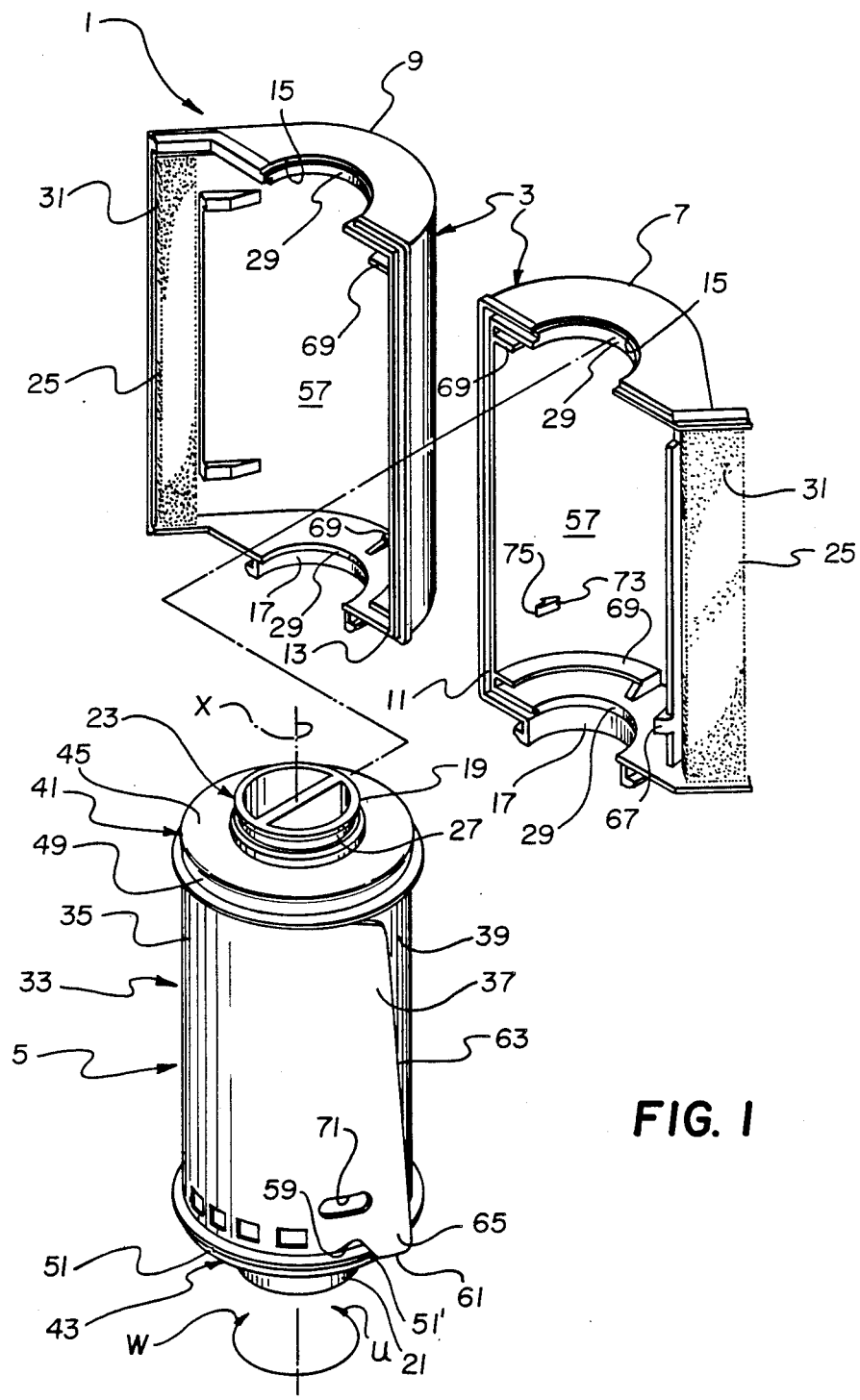
FIG. 1 is an exploded perspective view of an improved film cassette according to a preferred embodiment of the invention.
Figure 2:
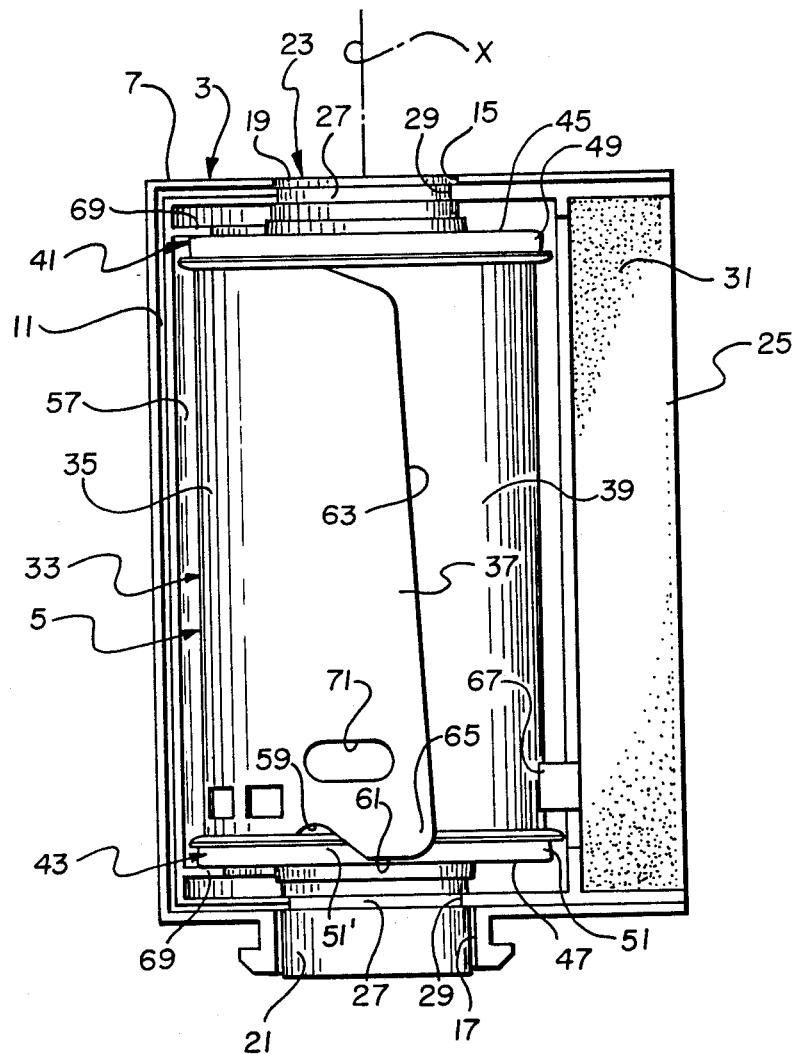
FIG. 2 is an elevation view of the film cassette, illustrating he cassette shell open to reveal a film roll coiled about a film spool.

Referring now to the drawings, FIGS. 1 and 2 depict an improved 35 mm film cassette 1 comprising a light-tight cassette shell 3 and a film spool 5 which is rotatable about an axis X in film unwinding and rewinding directions U and R within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite end extensions 19 and 21 of a spool core or hub 23, and they define a film passageway 25 to the exterior of the cassette shell 3. The longer and shorter end extensions 19 and 21 of the spool core 23 each include an annular groove 27 which mates with a corresponding edge 29 of the respective openings 15 and 17 to rotatably support the film spool 5 for rotation about the axis X in the film unwinding and rewinding directions U and R. A known black velvet or plush material 31 lines the interior of the film passageway 25 to prevent ambient light from entering the film passageway.

Figure 3:
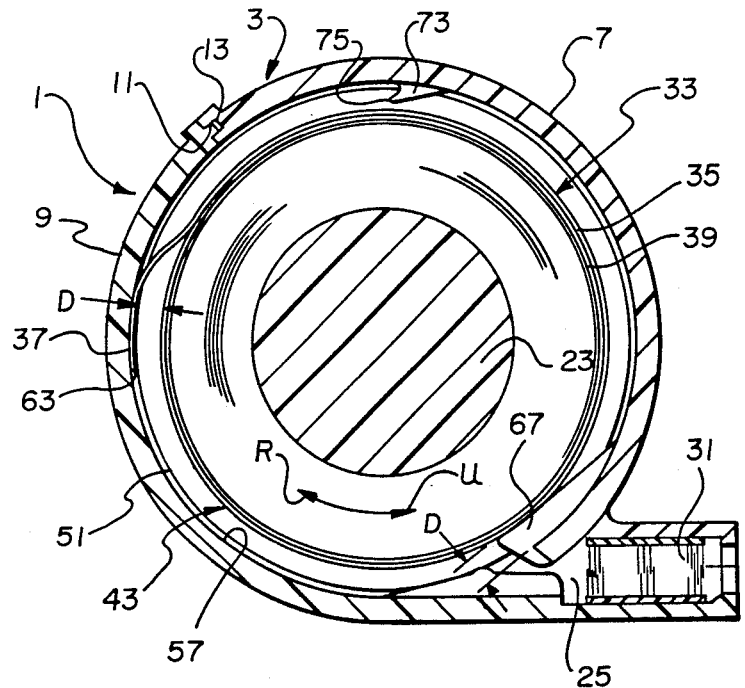
FIGS. 3 and 4 are end views in cross-section of the cassette shell, the film roll, and the film spool.

A roll 33 of 35 mm filmstrip is coiled about the spool core 23 to form successive film convolutions. As shown in FIG. 3, the film roll 33 includes an outermost convolution 35 which is a film leader having a leading or forward end 37, and it includes a next-inward convolution 39 coiled behind the outermost convolution. The inner or trailing end of an innermost convolution, not shown, of the film roll 33 is secured to the spool core 23.

A pair of upper and lower identical, very thin, flexible film constraining flanges 41 and 43 are coaxially spaced along the spool core 23 as shown in FIGS. 1, 2, and 5. The two flanges 41 and 43 comprise respective integral disks 45 and 47 and respective integral annular lips or skirts 49 and 51 which circumferentially extend from the disks. The two disks 45 and 47 cover opposite flat sides, not shown, of the film roll 33 which are defined by corresponding opposite longitudinal edges 53 and 55 of each successive convolution of the film roll, and they have respective central holes, not shown, through which the spool core 23 axially extends to permit rotation of the spool core relative to the flanges 41 and 43. See FIG. 5. The annular lips 49 and 51 overlap the outermost convolution (film leader) 35 of the film roll 33 radially outwardly of the respective longitudinal edges 53 and 55 of that convolution to radially confine the convolution to thus prevent it from radially expanding or clock-springing into substantial contact with an interior curved wall 57 of the cassette shell 3. A lip-receiving notch 59 is cut in the outermost convolution (film leader) 35 along its longitudinal edge 55, relatively close to its leading end 37, to receive a peripheral section 51' of the annular lip 51. This allows a relatively short edge-section 61 of the outermost convolution (film leader) 35 connecting the leading end 37 and the notch 59 to overlap the annular lip 51 radially outwardly to thus maintain the leading end spaced a radial distance D from the next-inward convolution 39 of the film roll 33. See FIGS. 3 and 6. The leading end 37 has a forward edge 63 inclined from the longitudinal edge 53 of the outermost convolution 35 to the other longitudinal edge 55 of that convolution to form a forwardmost tip or tab 65 of the convolution which, like the edge-section 61, overlaps the annular lip 51 radially outwardly. See FIG. 5.

A film stripper-guide 67 formed with the cassette half 7 is positioned immediately inward of the inner entry to the film passageway 25 to be received between the leading end 37 of the outermost convolution (film leader) 35 and the next-inward convolution 39, to pick up the leading end and guide it into the film passageway responsive to rotation of the film spool 5 in the unwinding direction U. The leading end 37 will be advanced over the stripper-guide 67 and into the film passageway 25, rather than between the stripper-guide and the next-inward convolution 39, because it is spaced the radial distance D from the latter convolution. Thus, as shown in FIG. 3, the leading end 37 will be located within range of the stripper-guide 67 due to such spacing from the next-inward convolution 39.

Figure 8:
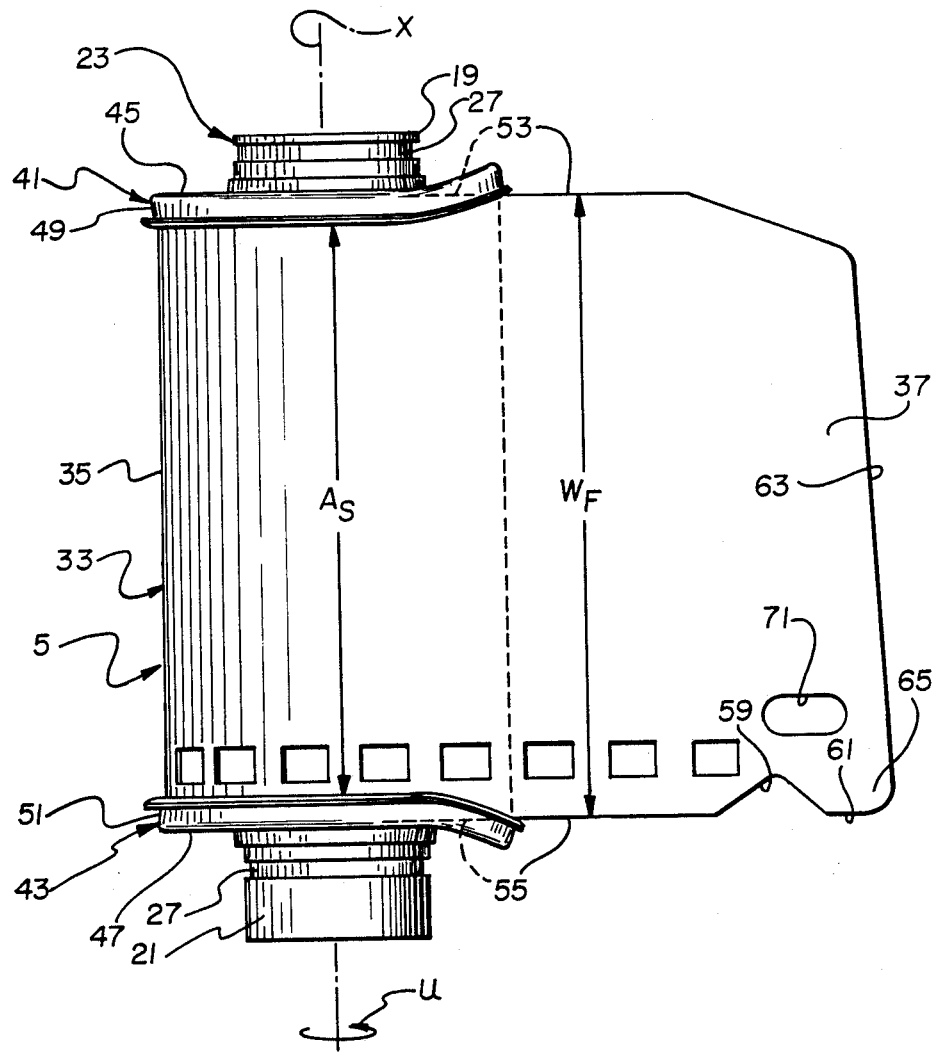

When the leading end 37 of the outermost convolution (film leader) 35 is advanced over the stripper-guide 67 responsive to rotation of the film spool 5 in the unwinding direction U, the longitudinal edges 53 and 55 of that convolution start to gently flex respective arcuate portions of the two flanges 41 and 43 axially away from one another as shown in FIG. 8, first to allow the notch 59 to separate from the lip section 51', and then to allow successive longitudinal sections of the film roll 33 (beginning with the leading end) to exit from between the flanges to the outside of the cassette shell 3. The local flexing of the flange 41 and 43 occurs because the film width $W_F$ between the longitudinal edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be locally flexed. A pair of flat curved bearing members 69 extend from the interior wall 57 of the cassette shell 3 to lie flatly against successive arcuate portions of the two disks 45 and 47 as the flanges 41 nd 43 are locally flexed axially away from one another, to thereby return the flexed portions of the flanges to their normal original non-flexed condition.

Figure 4:
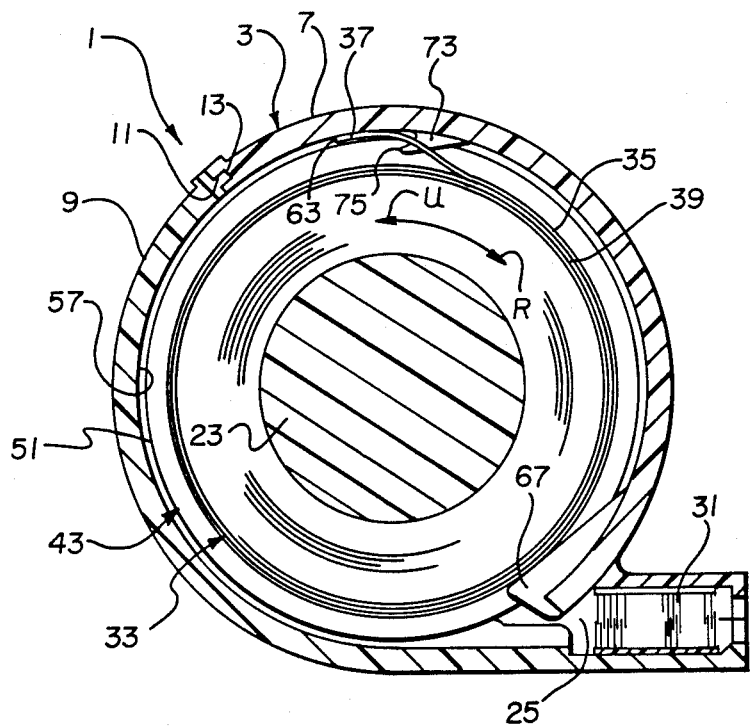
Figure 7:
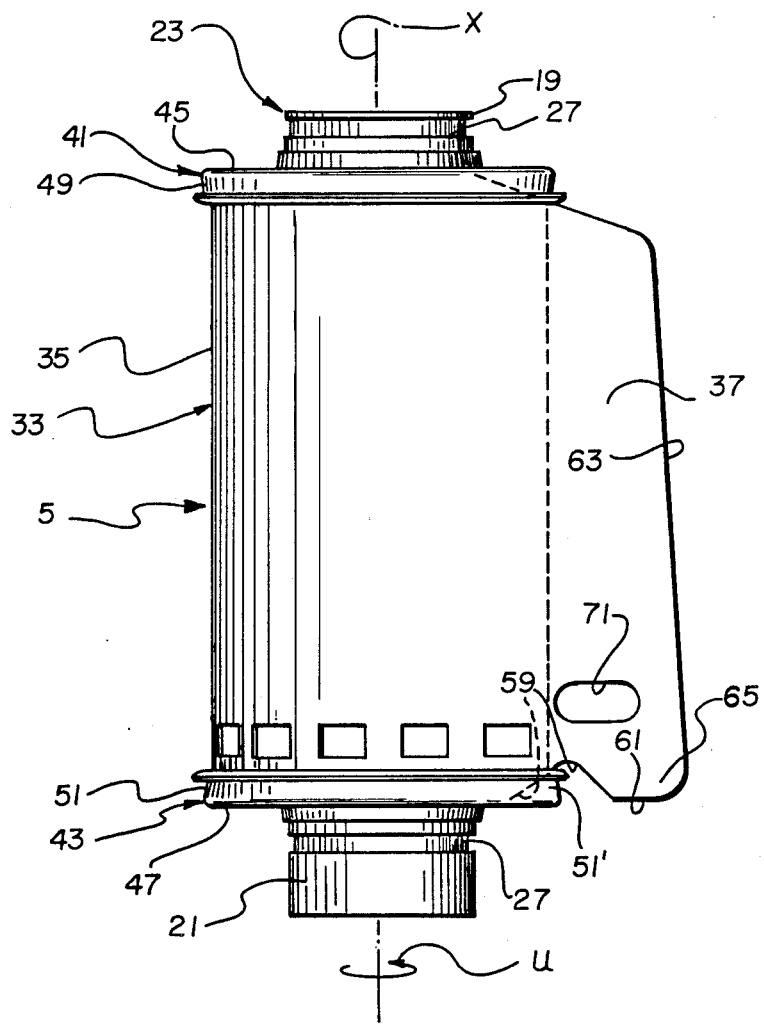
FIGS. 7 and 8 are elevation views similar to FIGS. 5 and 6, illustrating the manner in which the film roll is unwound from the film spool.

A slot 71 is cut in the outermost convolution (film leader) 35 substantially proximate its leading end 37. A tooth 73 fixed to the interior wall 57 of the cassette shell 3 has a free pointed end 75 which is positioned to be received in the slot 71 to thus engage the outer most convolution (film leader) 35, when the film spool 5 is rotated in the rewinding direction R as shown in FIG. 4, and to exit the slot to thus disengage that convolution, when the film spool is rotated in the unwinding direction U as shown in FIG. 3. The engagement of the outermost convolution 35 and the tooth 73 responsive to rotation of the film spool in the rewinding direction R prevents the leading end 37 of that convolution from coming to rest between the stripper-guide 67 and the next-inward convolution 39.

OPERATION

When (in a camera) the spool core 23 is initially rotated in the unwinding direction U, the two flanges 41 and 43 momentarily may remain stationary and the film roll 33, since its inner end is attached to the spool core, tends to expand radially or clock-spring to ensure a firm non-slipping relation between the outermost convolution (film leader) 35 of the film roll and the annular lips 49 and 51 of the flanges. Then, further rotation of the spool core 23 will similarly rotate the flanges 41 and 43. As a result, the leading end 37 of the outermost convolution (film leader) 35 will be advanced over the stripper-guide 67, causing successive arcuate portions of the flanges 41 and 43 to be flexed axially away from one another as shown in FIG. 8. This first allows the notch 59 to separate from the lip section 51', and then it allows successive longitudinal sections of the film roll 33 (beginning with the leading end 37) to exit from between the flanges to the outside of the cassette shell 3.

If (in the camera) the film spool 5 is rotated in the rewind direction R before the entire length of the filmstrip has been exposed, and it is desired to subsequently use the remaining available portion of the filmstrip at a later time, the film spool is rotated substantially until the slot 71 receives the free end 75 of the tooth 73 to thus engage the outermost convolution 35 (film leader) to the tooth. Thereafter, to use the remaining available portion of the filmstrip (in the camera), the film spool 5 is rotated in the unwinding direction U to disengage the outermost convolution (film leader) 35 from the tooth 73 and to re-advance the filmstrip to the outside of the cassette shell 3.

The invention has been described with reference to a preferred embodiment. However, it will be appreciated that variations and modifications can be effected within the ordinary skill in the art without departing from the scope of the invention. For example, respective notches may be cut in the outermost convolution 35 along its longitudinal edges 53 and 55 to receive the individual lips 49 and 51 of the two flanges 41 and 43. Alternatively, a notch might be cut in one or each of the annular lips 49, 51 to receive a corresponding edges 53, 55 of the outermost convolution 35. All that is required is that the outermost convolution 35 engage one or each of the annular lips 49, 51 to secure the edge-section 61 of that convolution to maintain the leading end 37 spaced the radial distance D from the next-inward convolution 39.

According to another example, only one of the two flanges 41 and 43 need include the annular lip 49 or 51.

The other flange need only comprise the disk 45 or 47 (without the annular lip).

I claim:

1. An improved film cassette wherein (a) a film spool is rotatable within the cassette shell, (b) a convoluted film roll whose outermost convolution is a film leader is coiled about said spool, (c) a pair of flanges are coaxially arranged on said spool to radially confine said film leader to prevent the leader from substantially contacting an interior wall of said cassette shell, and (d) a film stripper-guide is received between a leading end of said film leader and the next-inward convolution of said film roll succeeding the leader to remove said leader from said flanges and guide the leader through a film passageway to the exterior of said cassette shell responsive to rotation of said spool in a film unwinding direction, and wherein the improvement comprises:

said film leader and at least one of said flanges include mutual engagement means for maintaining said leading end of the leader spaced at least a minimum radial distance from said next-inward convolution sufficient to locate the leading end within range of said stripper-guide to ensure that said leading end will be advanced over the stripper-guide responsive to rotation of said spool in the film unwinding direction, whereby said leading end is prevented from being advanced between said stripper-guide and said next-inward convolution.

2. The improvement as recited in claim 1, wherein at least one of said flanges includes a peripheral annular lip adapted to overlap said film leader radially outwardly of a longitudinal edge of the leader to radially confine said leader, and said engagement means is adapted to secure said film leader along said longitudinal edge, relatively close to said leading end, to said annular lip to locate the leading end radially outwardly of the annular lip to separate said leading end from said next-inward convolution to thus maintain the leading end spaced said minimum radial distance from the next-inward convolution.

3. The improvement as recited in claim 2, wherein said stripper-guide is adapted to release said film leader from said annular lip as the stripper-guide is received between said leading end and said next-inward convolution responsive to rotation of said spool in the film unwinding direction.

4. The improvement as recited in claim 1, wherein at least one of said flanges includes a peripheral annular lip adapted to overlap said film leader radially outwardly of a longitudinal edge of the leader to radially confine said leader, and said engagement means includes a lip-receiving notch cut in said film leader along said longitudinal edge for receiving said annular lip to thus maintain said leading spaced said minimum radial distance from said next-inward convolution.

5. The improvement as recited in claim 4, wherein said lip-receiving notch is located relatively close to said leading end to allow a relatively short edge-section of said film leader connecting said leading end and the notch to overlap said annular lip radially outwardly.

6. The improvement as recited in claim 1, wherein said flanges include respective peripheral annular lips adapted to overlap said film leader radially outwardly of opposite longitudinal edges of the leader to radially confine said leader, and said engagement means includes a lip-receiving notch cut in said film leader along one of said longitudinal edges, relatively close to said leading end, for receiving one of said annular lips to allow a relatively short edge-section of the leader connecting said leading end and said notch to overlap the same lip radially outwardly to thus maintain the leading end spaced said minimum radial distance from said next-inward convolution.

7. The improvement as recited in claim 6, wherein said leading end of the film leader has a forward edge inclined from one of the longitudinal edges of said leader to the other longitudinal edge to form a forward-most tip of the leader proximate said edge-section of the leader that overlaps one of said annular lips radially outwardly.

8. The improvement as recited in claim 7, wherein said flanges are capable of being flexed axially away from each other, and said film leader has a resistance to transverse bowing that is greater than the resistance of the flanges to being flexed axially away from each other and a general width that is slightly greater than the axial spacing of said annular lip to thus cause the leader to flex said flanges axially away from each other responsive to said leader being removed from the flanges by said stripper-guide.

* * * * *